United States Patent
Suzuki

(10) Patent No.: US 8,522,613 B2
(45) Date of Patent: Sep. 3, 2013

(54) ACCELERATION SENSOR

(75) Inventor: Takeharu Suzuki, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 223 days.

(21) Appl. No.: 12/942,130

(22) Filed: Nov. 9, 2010

(65) Prior Publication Data

US 2011/0113881 A1    May 19, 2011

(30) Foreign Application Priority Data

Nov. 17, 2009   (JP) .................................. 2009-262104

(51) Int. Cl.
*G01P 15/12*   (2006.01)

(52) U.S. Cl.
USPC ..................................... 73/514.33; 73/514.38

(58) Field of Classification Search
USPC ............... 73/514.33, 514.36, 514.38
See application file for complete search history.

(56) References Cited

U.S. PATENT DOCUMENTS 6,892,578 B2 * 5/2005 Saitoh et al. ............... 73/514.33

FOREIGN PATENT DOCUMENTS

| JP | 7-280679 | 10/1995 |
|---|---|---|
| JP | 2000-187040 | 7/2000 |
| JP | 2006214963 A | 8/2006 |
| JP | 2007047111 A | 2/2007 |
| JP | 2007194572 A | 8/2007 |
| JP | 2008-026183 | 2/2008 |
| JP | 2008-170271 | 7/2008 |
| JP | 2009241164 A | 10/2009 |

OTHER PUBLICATIONS

Gary Li et al., "Low Stress Packaging of a Micromachined Accelerometer," IEEE Transactions on Electronics Packaging Manufacturing, vol. 24, No. 1, Jan. 2001, pp. 18-25.
Japanese Office Action dated Jun. 18, 2013.

* cited by examiner

*Primary Examiner* — John Chapman, Jr.
(74) *Attorney, Agent, or Firm* — Volentine & Whitt, PLLC

(57) ABSTRACT

There is provided an acceleration sensor including: a weight portion; plural fixed portions formed above a bottom plate around a periphery of the weight portion; a beam portion coupling the fixed portions and the weight portion, and holding the weight portion at a position separated from the bottom plate; a detection portion provided at the beam portion and detecting deformation of the beam portion; a frame portion provided so as to project out from the bottom plate and surround the fixed portions at a position separated from the fixed portions; and a lid portion of plate shape that seals an opening of the frame portion.

6 Claims, 12 Drawing Sheets

ACCELERATION SENSOR

CROSS-REFERENCE TO RELATED APPLICATION

This application is based on and claims priority under 35 USC 119 from Japanese Patent Application No. 2009-262104 filed on Nov. 17, 2009, the disclosure of which is incorporated by reference herein.

BACKGROUND

1. Technical Field

The present invention relates to an acceleration sensor and to a method of fabricating an acceleration sensor.

2. Related Art

Wafer-Level Chip Size Packages (WCSP) and plastic packages are effective as a way to realize more compact and lower cost electrical components, including ICs.

For example, in Document 1, G Li and A A Tseng, Low stress packaging of a miromachined accelerometer, IEEE Transactions on Electronics Packaging Manufacturing, Vol. 24, pp 18-25, January 2001, a configuration is described in which an acceleration sensor is sealed on a plate produced from silicon, and covered over with a gel. The acceleration sensor is cushioned from external stress by the gel and the silicon plate, suppressing influence on the sensing characteristics of the acceleration sensor.

A structure exists in which an acceleration sensor and a control IC are stacked and sealed with a resin (see, for example, Japanese Patent Application Laid-Open (JP-A) No. 2008-026183).

Furthermore, a pressure sensor structure is described in which thickened portions are provided at two locations on the external periphery of and inside of a sensor device, and external stress is borne by a leg portion (see, for example, JP-A No. 7-280679).

There is also a description relating to an external force detection sensor in which an SOI substrate is employed, wherein a flexible portion forming region of the SOI substrate is provided with a groove surrounding the entire periphery along a substrate front surface (see, for example, JP-A No. 2008-170271).

Furthermore, there is a description of a stress cushioning portion structure, wherein a groove is provided cut into the rear face side of a substrate around the external periphery of a device, and a groove is provided cut into the rear face of a support portion (see, for example, JP-A No. 2000-187040).

However, with the structure described in Document 1 above, while the stress to the acceleration sensor from outside is cushioned by the silicon plate, and influence on the sensor characteristics are suppressed, after substrate mounting, external stress from a direction along the substrate surface cannot be completely blocked from the detection portion of the sensor, and a concern exists that stress will cause a change in characteristics.

Furthermore, in the configuration of the fifth exemplary embodiment described in JP-A No. 2008-026183 above, FIG. 5, there is an SOIC package configured from a metal plate (bottom plate) and sealing resin, and since the sealing resin covers the outside of a support body, there is a concern that stress from the sealing resin is transmitted to the support body or a beam portion, with the possibility that stress might cause a change in characteristics of the sensor.

Furthermore, in the structure described in JP-A No. 7-280679, the leg portion on the outermost periphery is physically connected through a thinned portion to a diaphragm, and since the structure is not completely separated, when external stress is borne by the leg portion, the stress through the thinned portion is transmitted to the thickened portion and to the diaphragm, with a concern of this causing of a change in characteristics.

Furthermore, in the structure described in JP-A No. 2008-170271, the structure does not have the fixed portion completely surrounded by the groove and blocked off from the outside, and in side view the fixed portion is still connected to the outside, such that external stress is not completely blocked by the groove, to give a structure where there is concern of the external stress being transmitted to the fixed portion.

Furthermore, in the structure described in JP-A No. 2000-187040, a groove is provided cut into the rear face of the support portion as a stress relief portion, however the structure is such that external stress to the sensor chip cannot be completely blocked from the flexible portion by the cut in groove, and there is a concern that the external stress will cause a change in characteristics.

SUMMARY

The present invention is made in view of the above circumstances, and an object thereof is to provide an acceleration sensor in which the detection portion of the sensor is separated from an external frame, and a fabrication method of such an acceleration sensor.

A first aspect of the present invention provides an acceleration sensor including:

a weight portion;

plural fixed portions formed above a bottom plate around a periphery of the weight portion;

a beam portion coupling the fixed portions and the weight portion, and holding the weight portion at a position separated from the bottom plate;

a detection portion provided at the beam portion and detecting deformation of the beam portion;

a frame portion provided so as to project out from the bottom plate and surround the fixed portions at a position separated from the fixed portions; and a lid portion of plate shape that seals an opening of the frame portion.

In the invention of the above configuration, since the frame portion surrounds the periphery of the acceleration sensor, and the beam portion and the fixed portion on which the beam portion is provided for suspending the weight portion are separated from the frame portion, even if external stress is applied to the frame portion, the stress does not directly affect the fixed portion or the beam portion, and measurement precision can be maintained.

A second aspect of the present invention provides the acceleration sensor of the first aspect, further including:

a fixed portion connection pad provided at an end portion of the fixed portion and transmitting an electrical signal from the detection portion;

a first lid portion connection pad provided at the inside face of the lid portion and making contact with the fixed portion connection pad;

a second lid portion connection pad provided at the inside face of the lid portion and connected by wiring to the first lid portion connection pad;

a frame portion connection pad provided at the frame portion and making contact with the second lid portion connection pad; and a bonding pad provided at the frame portion so as not to contact the lid portion and connected by wiring to the frame portion connection pad, for transmitting an electrical signal to outside of the acceleration sensor, wherein a plane of the beam portion facing the lid portion and a plane of the fixed portions facing the lid portion are in a same plane.

In the invention of the above configuration, since the fixed portion and the frame portion are separated, wiring and connection pads are provided to the lid portion that contacts both the fixed portion and the frame portion, enabling the detection portion provided to the beam portion and an external portion to be electrically connected.

A third aspect of the present invention provides the acceleration sensor of the first aspect, wherein the wiring provided at the lid portion is a diffusion layer wiring line.

In the invention of the above configuration, a thinner film can be achieved and reliability improved by using the diffusion layer wiring line.

A fourth aspect of the present invention provides the acceleration sensor of the first aspect, wherein the bottom plate and the lid portion are glass substrates.

In the invention of the above configuration, a configuration can be achieved with excellent strength and shock resistance by employing the glass substrate.

A fifth aspect of the present invention provides the acceleration sensor of the first aspect, wherein an outside of the frame portion is sealed with a sealing resin, and a sealing frame is provided to each of the frame portion and the lid portion to prevent the sealing resin from penetrating inside the frame portion.

In the invention of the above configuration, a configuration can be achieved in which penetration of the sealing resin inside the frame portion is prevented by providing the sealing frames to the frame portion and the lid portion and by sealing the outside of the frame portion with the sealing resin.

A sixth aspect of the present invention provides an acceleration sensor including, on a wafer for forming devices:

a weight portion;

plural fixed portions formed above a bottom plate around a periphery of the weight portion;

a beam portion coupling the fixed portion and the weight portion, and holding the weight portion at a position separated from the bottom plate;

a detection portion provided at the beam portion and detecting deformation of the beam portion;

a frame portion provided so as to project out from the bottom plate and surround the fixed portions;

a plate shaped wiring board that seals an opening in the frame portion;

a fixed portion connection pad provided at an end portion of the fixed portion and transmitting an electrical signal from the detection portion;

a first wiring board connection pad provided at the inside face of the wiring board and making contact with the fixed portion connection pad;

a second wiring board connection pad provided at the inside face of the wiring board and connected by wiring to the first wiring board connection pad;

a frame portion connection pad provided at the frame portion and making contact with the second wiring board connection pad; and a post provided so as to pass through the wiring board, for transmitting an electrical signal from the second wiring board connection pad to outside of the wiring board, wherein the wafer is diced at the outside of the frame portion to form devices.

In the invention of the above configuration, in a package form called a Wafer-level Chip Size Package (WCSP), since the packaging processes are all completed in the wafer state, the surface area of the completed package is exactly the same as that of the small sized device itself, and due to mounting to a substrate being easily achieved, an acceleration sensor capable of high precision mounting can be obtained.

A seventh aspect of the present invention provides an acceleration sensor according to the sixth aspect, wherein the wiring board is a control IC.

In the invention of the above configuration, by employing the control IC as the wiring board for sealing the frame portion, even higher precision of mounting can be enabled.

An eighth aspect of the present invention provides a method of fabricating an acceleration sensor, the method including:

forming a weight portion;

forming plural fixed portions above a bottom plate around a periphery of the weight portion;

forming a beam portion coupling the fixed portion and the weight portion, and holding the weight portion at a position separated from the bottom plate;

forming a detection portion at the beam portion and detecting deformation of the beam portion;

forming a frame portion so as to project out from the bottom plate and surround the fixed portions;

forming a plate shaped lid portion that seals an opening in the frame portion;

sealing the frame portion with the lid portion;

forming a fixed portion connection pad at an end portion of the fixed portion and transmitting an electrical signal from the detection portion;

forming a first lid portion connection pad at the inside face of the lid portion and making contact with the fixed portion connection pad;

forming a second lid portion connection pad at the inside face of the lid portion and connected by wiring to the first lid portion connection pad;

forming a frame portion connection pad at the frame portion and making contact with the second lid portion connection pad; and forming a bonding pad at the frame portion so as not to contact the lid portion and connected by wiring to the frame portion connection pad, for transmitting an electrical signal to outside of the acceleration sensor.

In the invention of the above configuration, due to providing the frame portion surrounding the external periphery of the acceleration sensor, and providing the beam portion and the fixed portion provided with the beam portion for suspending the weight portion so as to be separated from the frame portion, even if external stress is applied to the frame portion, the stress does not directly affect the fixed portion and the beam portion, and the measurement precision can be maintained. Furthermore, due to the fixed portions being separated from the frame portion, the wiring and connection pads are provided to the lid portion that contacts both the fixed portion and the frame portion, enabling the detection portion provided to the beam portion and an external portion to be electrically connected.

A ninth aspect of the present invention provides the method of fabricating an acceleration sensor of the eighth aspect, the method further including:

forming a sealing frame for each of the frame portion and the lid portion to prevent a sealing resin from penetrating inside the frame portion; and sealing the outside of the frame portion with the sealing resin.

In the invention of the above configuration, a configuration can be achieved in which penetration of the sealing resin inside the frame portion is prevented and there is no affect on the measurement precision by providing the sealing frames to the frame portion and the lid portion and by sealing the outside of the frame portion with the sealing resin.

A tenth aspect of the present invention provides a method of fabricating an acceleration sensor including, on a wafer for forming devices:

forming a weight portion;

forming plural fixed portions formed above a bottom plate around a periphery of the weight portion;

forming a beam portion coupling the fixed portion and the weight portion, and holding the weight portion at a position separated from the bottom plate;

forming a detection portion at the beam portion and detecting deformation of the beam portion;

forming a frame portion so as to project out from the bottom plate and surround the fixed portions;

forming a plate shaped wiring board that seals an opening in the frame portion;

forming a fixed portion connection pad at an end portion of the fixed portion and transmitting an electrical signal from the detection portion;

forming a first wiring board connection pad at the inside face of the wiring board and making contact with the fixed portion connection pad;

forming a second wiring board connection pad at the inside face of the wiring board and connected by wiring to the first wiring board connection pad;

forming a frame portion connection pad at the frame portion and making contact with the second wiring board connection pad;

forming a post provided so as to pass through the wiring board, for transmitting an electrical signal from the second wiring board connection pad to outside of the wiring board; and dicing the wafer at the outside of the frame portion to form devices.

In the invention of the above configuration, since the packaging processes are all completed in the wafer state, the surface area of the completed package is exactly the same as that of the compact device itself, and due to mounting to a substrate being easily achieved, an acceleration sensor capable of high precision mounting can be obtained.

Due to the above configurations, the present invention can achieve an acceleration sensor in which the detection portion of the sensor is separated from an external frame, as well as an acceleration sensor fabrication method of the same.

BRIEF DESCRIPTION OF THE DRAWINGS

Exemplary embodiments of the present invention will be described in detail based on the following figures, wherein.

DETAILED DESCRIPTION

Exemplary Embodiments

Detailed explanation follows regarding exemplary embodiments of the present invention.

FIG. 1 to FIG. 4 show a structure of an acceleration sensor according to a first exemplary embodiment of the present invention. This acceleration sensor 1 is a tri-axial acceleration sensor employing piezoresistors.

Figure 1:
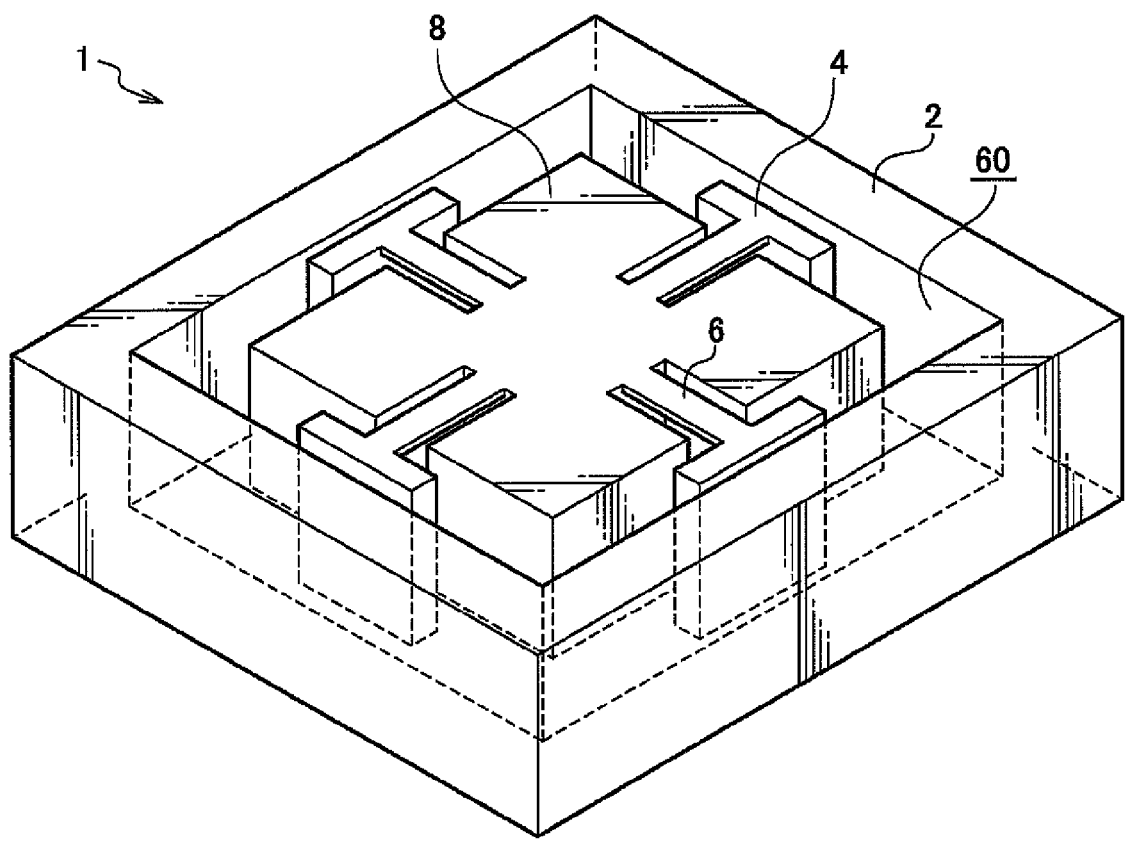
FIG. 1 is a perspective view showing a structure of an acceleration sensor according to a first exemplary embodiment of the present invention.
Figure 1:
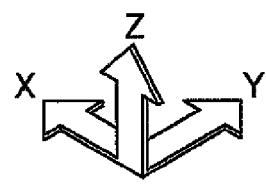
Figure 2A:
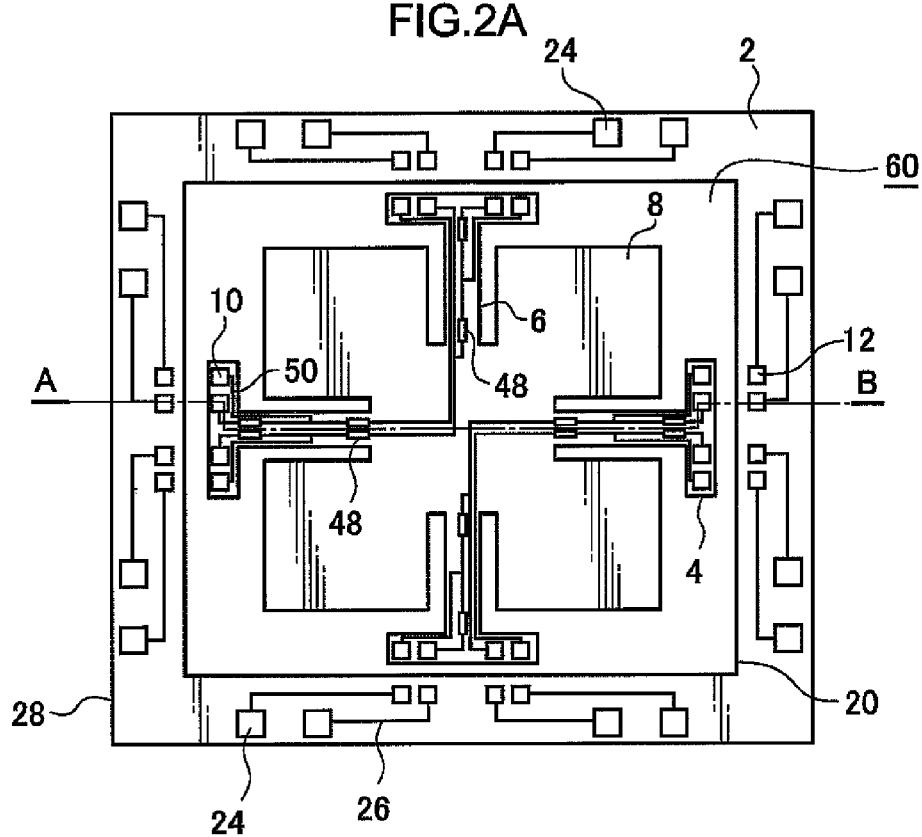
FIG. 2A and FIG. 2B are plan views showing the structure of the acceleration sensor shown in FIG. 1.
Figure 2B:
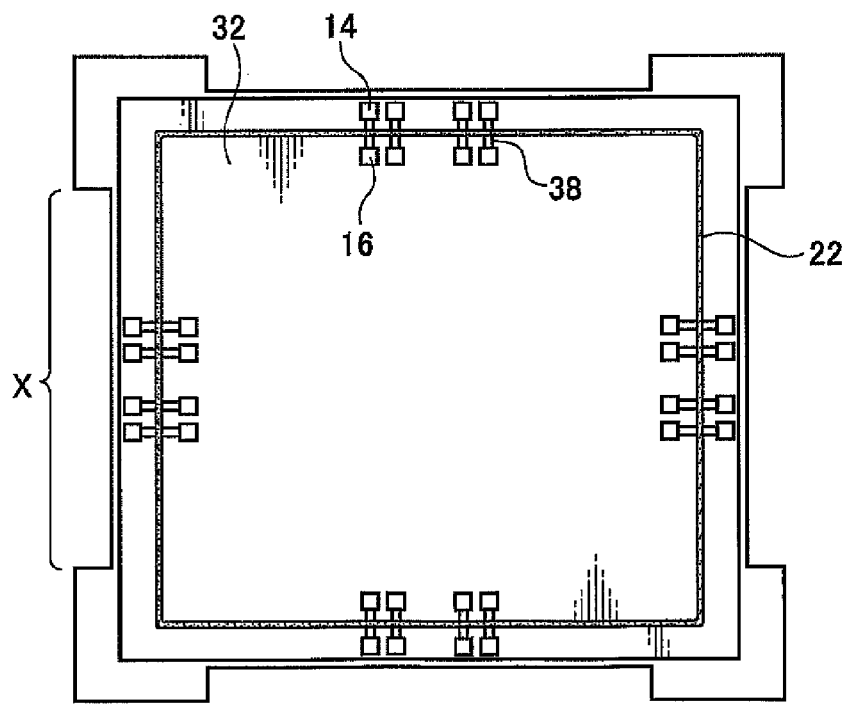
Figure 3:
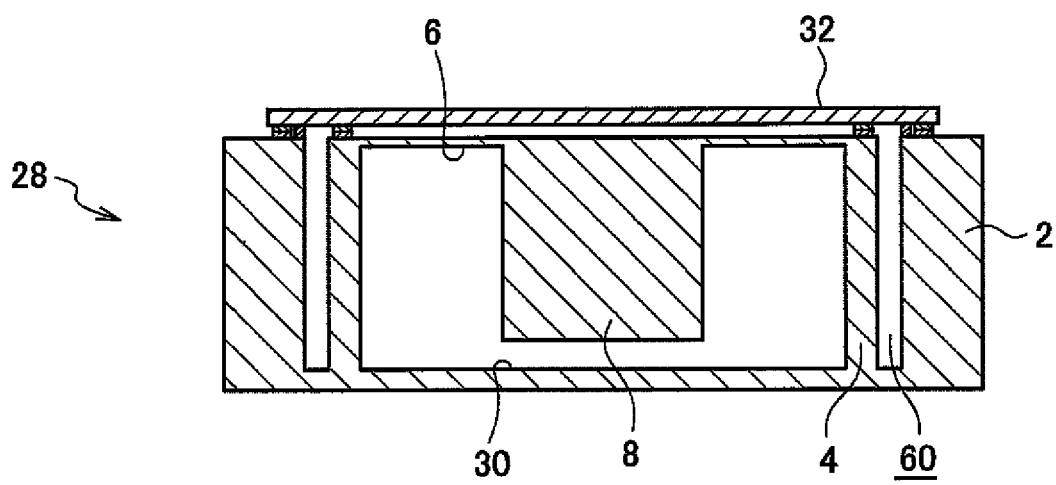
FIG. 3 is a cross-section showing the structure of the acceleration sensor shown in FIG. 1.

FIG. 1 is a perspective view of the acceleration sensor 1 according to a first exemplary embodiment of the present invention, FIG. 2A is a plan view of a sensor section 28 of the acceleration sensor 1 according to the first exemplary embodiment, as viewed looking down on a bottom silicon substrate 30 shown in FIG. 3, FIG. 2B is a plan view looking up from the bottom-face silicon substrate 30, and FIG. 3 is a cross-section.

As shown in FIG. 1 to FIG. 3, the acceleration sensor 1 is, for example, a substantially square box shape in plan view, with sides of a few mm long, and with the bottom-face silicon substrate 30 supported by a control IC 54, described below. The acceleration sensor 1 is provided with the sensor section 28 above the bottom-face silicon substrate 30. The sensor section 28 is, for example, formed by subjecting a Silicon On Insulator (SOI) wafer to processing, such as etching or the like.

A wall shaped external frame 2 is substantially the same shape in plan view as the bottom-face silicon substrate 30, and is provided on the bottom-face silicon substrate 30. The external frame 2 is, for example, formed from silicon as an enclosing wall without a break in the periphery, blocking out dust by surrounding the periphery of the detector portion of the acceleration sensor 1 and forming part of the sensor section 28. Namely, in plan view the external frame 2 is a wall shaped frame forming a similar shape to that of the bottom-face silicon substrate 30 (in this case a substantially square shape) with a space 60 formed inside.

For example, for the acceleration sensor 1 mounted on the bottom-face silicon substrate 30 shown in FIG. 3, configuration is made such that external force (such as physical pressing force or the like) applied to the sensor section 28 from a direction along the bottom-face silicon substrate 30 (the left-right direction in the drawing) is borne by the external frame 2, and the internal structure of the sensor section 28 is physically protected.

As shown in FIG. 3, plural silicon columns 4 are provided protruding upwards from the bottom-face silicon substrate 30, for example, as shown in FIG. 1 and FIG. 2A, separated by a specific separation distance from the external frame 2, and separated from each other at intervals above the bottom-face silicon substrate 30.

Beams 6 are provided running along the direction of the bottom-face silicon substrate 30 from the distal end of each of the respective silicon columns 4, with the distal ends of the beams 6 formed so as to be integrated to a weight portion 8 in the vicinity of substantially the center of the space 60. The weight portion 8 is suspended by the beams 6 above the bottom-face silicon substrate 30 with a gap therebetween, such that when, for example, imparted with a force due to inertia from acceleration, the weight portion 8 bends the beams 6 in any one or other of the directions XYZ shown in FIG. 1, or a combination of these directions.

A piezoresistor 48 is provided to each of the beams 6, and the piezoresistors 48 detect bending of the beams 6 caused by the weight portion 8 as a change in electrical resistance, due to a piezoresistive effect in which the resistivity of the piezoresistor 48 changes due to bending imparted to the beam 6 as described above.

As shown in FIG. 2A, column-top connection pads 10 formed, for example, from polysilicon are provided on the distal ends of the silicon columns 4, connected to the piezoresistors 48 by wiring 50. The column-top connection pads 10 may, for example, be poly-silicon pads provided on an oxide film formed to the distal ends of the silicon columns 4.

In a similar manner, external-frame-top connection pads 12 formed, for example, from polysilicon are provided at the end faces of the external frame 2, namely the faces on the furthest side from the bottom-face silicon substrate 30, and are similarly connected to bonding pads 24 provided on the end faces of the external frame 2 by wiring 26. The bonding pads 24 are terminals for connection to a control IC or the like, for external control of the acceleration sensor 1, and the wiring 26 and the bonding pads 24 are, for example, formed from aluminum or the like when forming devices.

As shown in FIG. 1 and FIG. 2A, in the sensor section 28 the silicon columns 4 are separated from the external frame 2 by a specific separation distance, and since there is no physical contact made therebetween, a connection component is provided to transmit the electrical resistance value detected by the piezoresistor 48 from the column-top connection pads 10 to the external frame 2.

Namely, outside wiring pads 14 that make contact with the external-frame-top connection pads 12, and inside wiring pads 16 that make contact with the column-top connection pads 10, are provided on a wiring board 32, with the outside wiring pads 14 and the inside wiring pads 16 connected together with wiring 38. The column-top connection pads 10 and the external-frame-top connection pads 12 are thereby electrically connected to by bonding the wiring board 32 to the sensor section 28.

FIG. 2B shows the wiring board 32 as seen from the bottom-face silicon substrate 30 direction. The wiring board 32 is bonded to the external frame 2 of the sensor section 28 so as to face the bottom-face silicon substrate 30, and seals the opening of the box shaped structure formed by the external frame 2.

The inside wiring pads 16 of the wiring board 32 make contact with the column-top connection pads 10 (the silicon columns 4), and the outside wiring pads 14 make contact with the external-frame-top connection pads 12 (the external frame 2) provided at the distal end of the external frame 2, thereby making electrical connection.

A sensor-side seal frame 20 and a wiring-board-side seal frame 22 are provided to the external frame 2 and the wiring board 32, as shown in FIG. 2A and FIG. 2B. The sensor-side seal frame 20 of the external frame 2 may, for example, be made from polysilicon, and the wiring-board-side seal frame 22 may, for example, be made from a thin gold film.

When the external frame 2 and the wiring board 32 have been bonded together, the sensor-side seal frame 20 and the wiring-board-side seal frame 22 make close contact with each other and physically seals off and blocks the space 60 at the inside of the sensor section 28 from the outside.

FIG. 3 shows a cross-section of the sensor section 28. The sensor section 28 may be, for example, a silicon-on-insulator (SOI) substrate in which a single crystal silicon layer is formed on an insulator film such as silicon oxide or the like. As shown in FIG. 3, the wiring board 32 is bonded over to the sensor section 28 so as to give an integrated structure. Au—Si eutectic bonding or the like can, for example, be employed as the method of bonding the sensor section 28 and the wiring board 32. Similarly, Au—Si eutectic bonding or the like can be employed to give an integrated structure to the bottom-face silicon substrate 30 and the sensor section 28.

Figure 4:
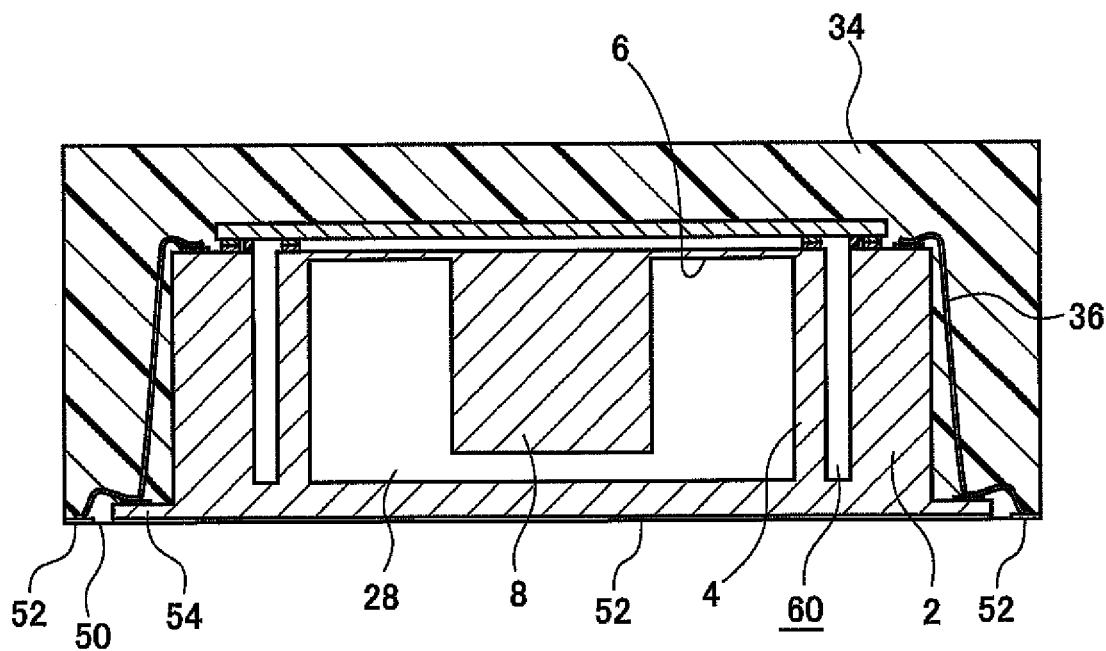
FIG. 4 is a cross-section showing an example of an application of the acceleration sensor shown in FIG. 1.
Figure 5A:
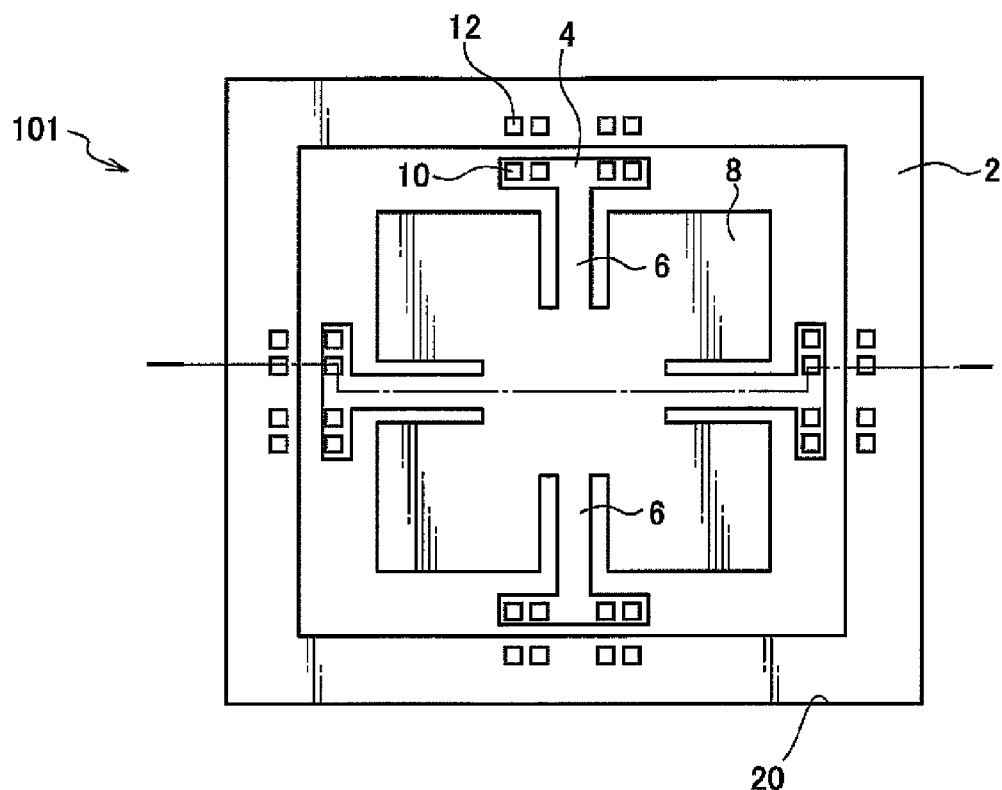
FIG. 5A and FIG. 5B are plan views showing a structure of an acceleration sensor according to the second exemplary embodiment.
Figure 5B:
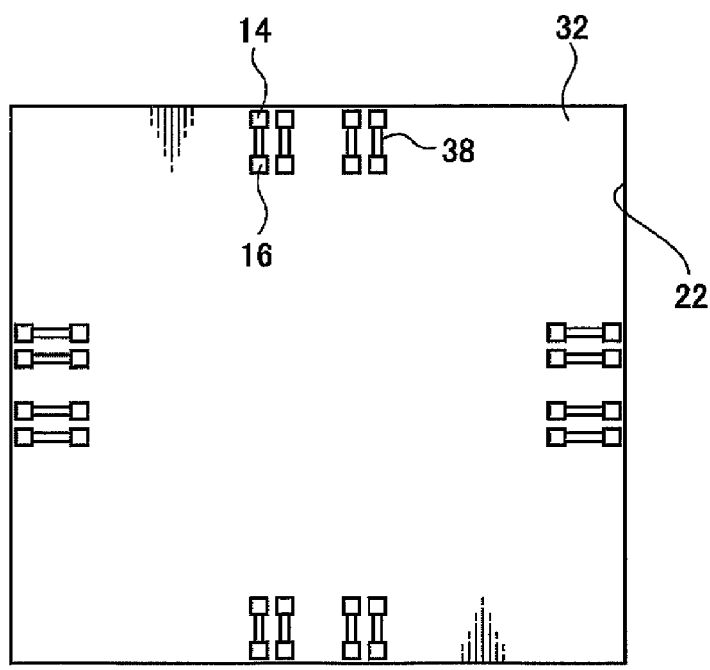

FIG. 4 shows the acceleration sensor 1 mounted on the control IC 54 for controlling the acceleration sensor 1, and shows a wiring structure by bonding wires 36 to a lead frame 52 employed for external electrical connection.

Namely, the bonding pads 24 connected to the piezoresistor 48 are provided to the sensor section 28 that has been bonded to the wiring board 32, and connected to the control IC 54 by the bonding wires 36. The control IC 54 is mounted to the lead frame 52, and wired to the lead frame 52 with the bonding wires 36. The control IC 54 is thereby electrically connected externally through the lead frame 52.

Furthermore, as shown in FIG. 4, the control IC 54 and the lead frame 52, including the bonding wires 36 and the like, may be sealed with a sealing resin 34, so as to give as the overall final form a structure provided as a single individual resin component.

Fabrication Method

Explanation now follows regarding a fabrication method of the acceleration sensor 1, with reference to FIG. 8A to FIG. 10E. However, it should be stressed that the fabrication method, materials, physical properties, dimensions and the like in the following explanation are merely an example thereof, and there are not limitations to this method.

Figure 8A:
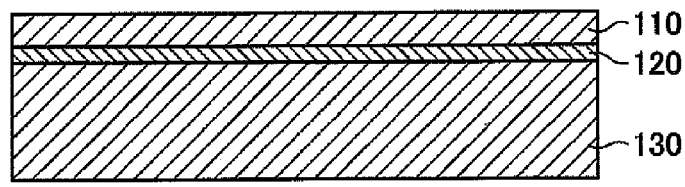
FIG. 8A to FIG. 8F are cross-sections showing a fabrication method of an acceleration sensor according to the first exemplary embodiment of the present invention.
Figure 8B:
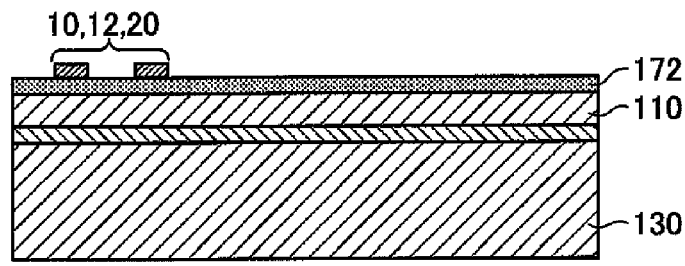
Figure 8C:
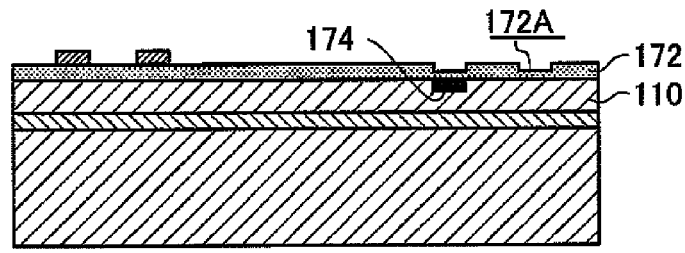
Figure 8D:
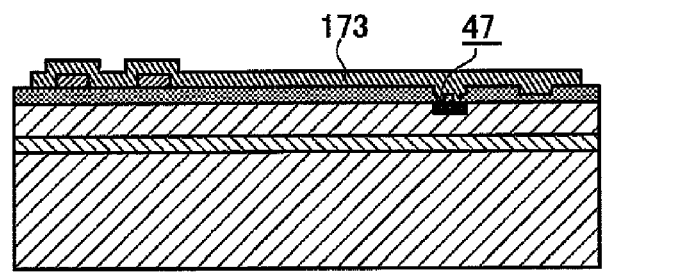
Figure 8E:
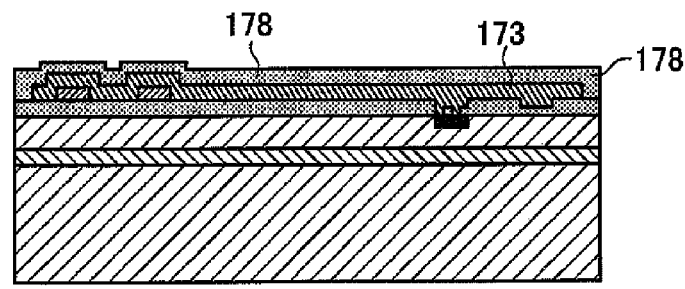
Figure 8F:
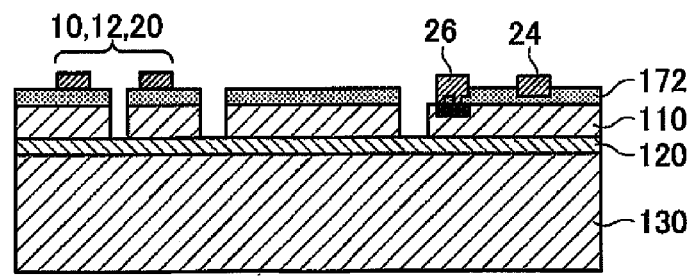
Figure 9A:
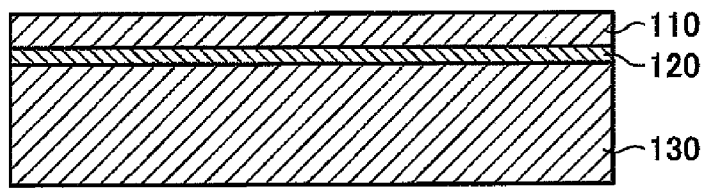
FIG. 9A to FIG. 9F are cross-sections showing a fabrication method of an acceleration sensor according to the first exemplary embodiment of the present invention.

Cross-sections on A-B of the acceleration sensor 1 shown in FIG. 2A are shown in FIG. 8A to FIG. 8F, and other cross-sections thereof in FIG. 9A to FIG. 9F. FIG. 8A to FIG. 8F are cross-sections taken at a location that does not include the bonding pads 24, and FIG. 9A to FIG. 9F are cross-sections taken at a location that does include the bonding pads 24. First, as shown in FIG. 8A and FIG. 9A, for example, a 3-layer structure SOI wafer is prepared in a process 1, having, for example, a silicon substrate 130 of a thickness of 525 μm with a volume resistivity of about 16 Ω/cm, an interposed buried insulator layer 120 formed from oxidized silicon at a thickness of about 2 μm, and a N-type silicon substrate (active layer) 110 thereon that is 5 μm thick and has a volume resistivity of about 6 to 8 Ω/cm.

Figure 9B:
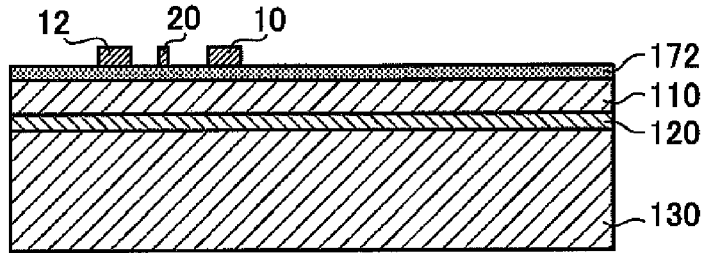

Next, as shown in FIG. 8B and FIG. 9B, in a process 2, an oxide film (protection film) 172 of, for example, about 0.4 μm is formed on the surface of the silicon substrate 110 in thermal oxidizing conditions using a humidifying atmosphere of about 1000° C.

Polysilicon is formed as a film on the oxide film 172 using a Chemical Vapor Deposition (CVD) method, the column-top connection pads 10 are formed by photolithography and etching, and the external-frame-top connection pads 12 and the sensor-side seal frame 20 are formed in polysilicon.

Figure 9C:
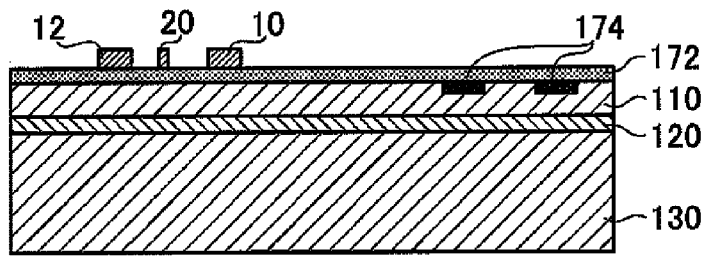

Next, as shown in FIG. 8C and FIG. 9C, in a process 3, using a photolithographic etching technique, opening portions are provided in a resist to expose the oxide film 172. Boron is implanted through the oxide film 172 by a boron diffusion method, and a P-type diffusion layer 174 that will become the piezoresistor 48 (see FIG. 2) is formed on the surface of the silicon substrate 110 (active layer). Annealing (thermal stress relief) is performed after resist separation and the desired diffusion profile is obtained.

Next, openings for the contact portions with the piezoresistors 48 are made in the oxide film 172 by photolithography and etching.

Figure 9D:
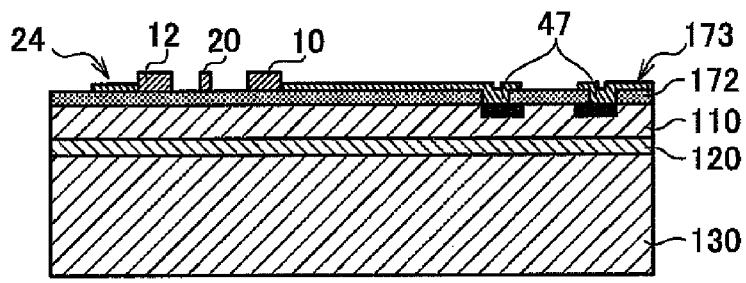

Then, as shown in FIG. 8D and FIG. 9D, in a process 4, a metal sputtering technique is employed to deposit aluminum on the oxide film 172, forming an aluminum layer 173. The aluminum layer 173 is then etched using photolithographic technology, to form the contact portions 47 with the piezoresistors 48, and portions that will become the wiring 26 and the bonding pads 24.

Figure 9E:
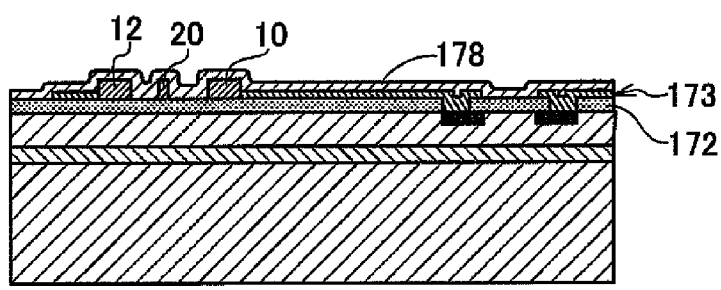

Then, as shown in FIG. 8E and FIG. 9E, in a process 5, a Plasma Reactive Deposition (PRD) method or the like is employed to form a passivation layer 178 for protection on the surface of the oxide film 172 and the aluminum layer 173 formed above the oxide film 172.

Figure 9F:
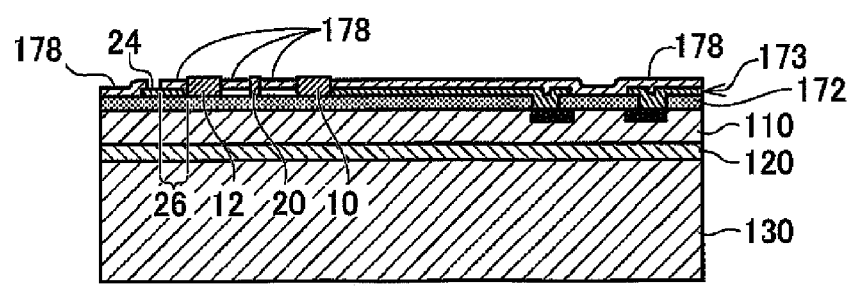

Then, as shown in FIG. 8F and FIG. 9F, in a process 6, a photoresist is formed on the passivation layer 178, and openings are formed therein by photolithography and etching at portions for the column-top connection pads 10, the external-frame-top connection pads 12, the sensor-side seal frame 20 and the bonding pads 24.

Explanation follows regarding processing of the SOI wafer from the rear surface, with reference to FIG. 10A to FIG. 10E. Note that the left hand half of FIG. 10A to FIG. 10E shows a cross-section at a location where the beam 6 is present (cross-section A-B in FIG. 2A), and the right hand half a cross-section at a location where the silicon column 4 and the weight portion 8 are not connected together.

Figure 10A:
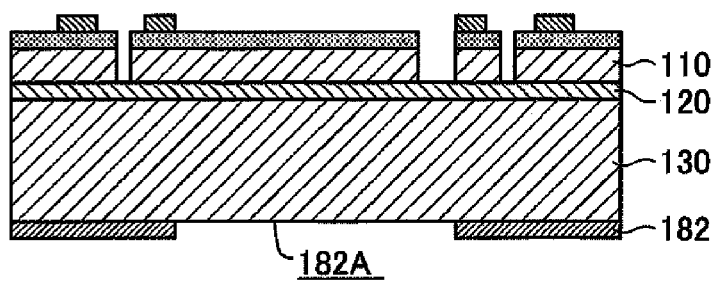
FIG. 10A to FIG. 10E are cross-sections showing a fabrication method of an acceleration sensor according to the first exemplary embodiment of the present invention.

As shown in FIG. 10A, in a process 7, an oxide film 182 is formed by a CVD technique on the rear surface of the SOI wafer, namely on the front surface of the silicon substrate 130. An opening is made at a portion that will be the weight portion 8. Namely, the oxide film 182 is left remaining at the periphery, and a central portion of the oxide film 182, corresponding to the portion that will later become the weight portion 8, is removed using photolithography technology, forming an opening portion 182A.

Figure 10B:
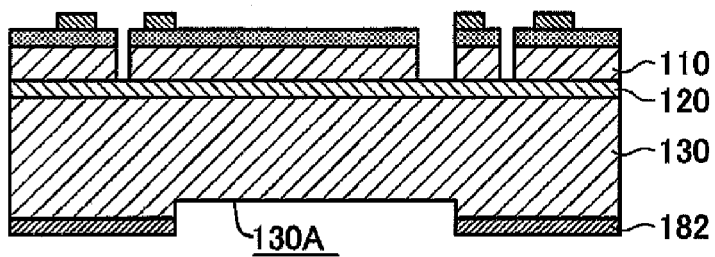

Next, as shown in FIG. 10B, in a process 8, the front surface of the silicon substrate 130 is etched by D-RIE (by a silicon high aspect ratio etch method, known as the Bosch method) while employing the remaining peripheral portion of the oxide film 182 as an etching mask, to a depth of, for example, about 20 μm, forming a recess 130A. The weight portion 8 is cut away to an amount such that the weight portion 8 and the bottom-face silicon substrate 30 will not make contact with each other, providing a gap.

Figure 10C:
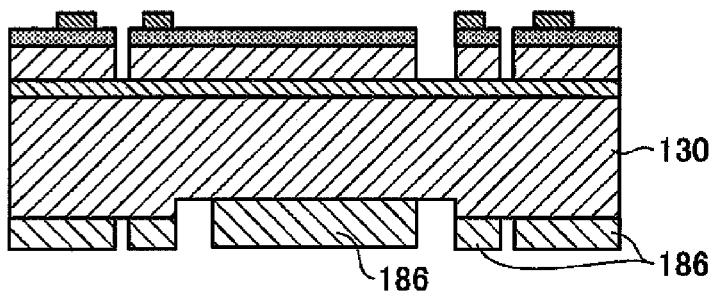

Next, as shown in FIG. 10C, in a process 9, resist is coated, and an etching mask 186 is formed with a photolithographic technique in order to form a gap in the silicon substrate 130 between the silicon columns 4 and the weight portion 8.

Figure 10D:
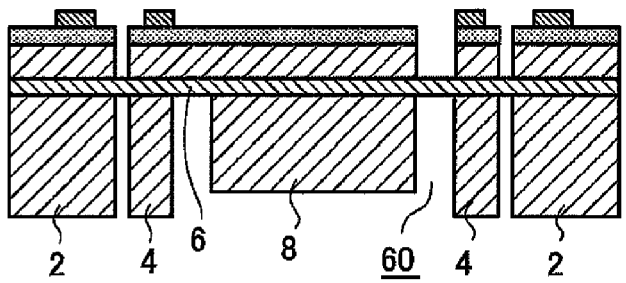

Next, as shown in FIG. 10D, in a process 10, D-RIE is employed to form the space 60.

Figure 10E:
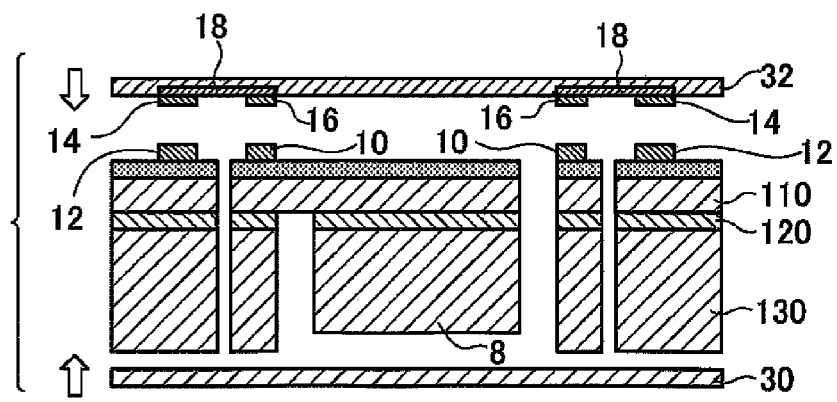

Next, as shown in FIG. 10E, in a process 11, the SOI wafer that has been finished up to process 10 is etched with D-RIE, and the buried insulator layer 120 formed between the silicon substrates 110, 130 is dry or wet etched.

Next, the sensor section 28 formed up to this process and the bottom-face silicon substrate 30 are bonded by Au—Si eutectic bonding.

Next, returning again to the front surface of the SOI wafer, a resist is coated, and openings formed by photolithography at locations other than those of the weight portion 8, the external frame 2, the silicon columns 4 and the beams 6. These opening portions meet as a gap between the silicon columns 4 and the weight portion 8. The passivation layer 178 and the oxide film 172 at the opening portions are dry or wet etched. Then, silicon etching is performed with D-RIE to an amount of the thickness of the active layer. The portions that were etched previously at process 10 are thereby etched through and the external frame 2, the silicon column 4, the weight portion 8 and the like are separated. Finally the resist is removed to complete the sensor section 28.

Next, the sensor section 28 bonded to the bottom-face silicon substrate 30 is bonded to the wiring board 32 by Au—Si eutectic bonding. A structure is thereby achieved in which the wiring board 32 acts as a lid on the external frame 2.

The fabrication method for the bottom-face silicon substrate 30 is, for example, as described below. First, the front surface of a silicon substrate is formed with films of Cr and Au using sputtering. A resist is coated, and openings made in the resist except for the locations where the external frame 2 and the silicon column 4 are to be bonded. The Cr and Au at the opening portions is removed by wet etching, and the resist removed. A Cr film and an Au film are thereby left remaining at the locations where the external frame 2 and the silicon column 4 are to be bonded.

An Au layer of several μm thick is then formed by sputtering (or vacuum deposition) on the bonding surface of the bottom-face silicon substrate 30 formed as above. An Au—Si eutectic bond is then formed by superimposing the Au layer and the counter party Si connection face in an atmosphere at higher temperature (about 400° C.) than the Au—Si eutectic temperature of 363° C., and by applying a load of between several kg/cm$^2$ to several tens of kg/cm$^2$.

The fabrication method for the wiring board 32 is, for example, as described below. First an oxide film is formed on a silicon substrate, then, in order to form wiring 18 as diffusion layer wiring lines, boron is implanted by a boron diffusion method using the resist as a mask. Then, after removing the resist, annealing (thermal stress relieve) is performed, to obtain a specific diffusion profile.

Openings are then made in the oxide film at locations corresponding to contact portions with the diffusion layer using photolithography and etching. Cr and Au films are formed on the surface of the substrate by sputtering, and opening portions for the outside wiring pads 14, the inside wiring pads 16, and the wiring-board-side seal frame 22 formed by photolithography and etching.

Next, resist is coated on the rear surface of the wiring board 32, and openings are made in the resist at positions to expose the bonding pad portions. The opening portions, like those shown by X in FIG. 2, can be made by etching the silicon using D-RIE while the resist is employed as a mask. The resist is then removed, completing the wiring board 32.

Then, similarly to a normal semiconductor fabrication method, chips are cut out from the SOI wafer and, for example, mounted on the control IC 54, and after performing specific wiring onto the lead frame 52 with the bonding wires 36, sealing is made with the sealing resin 34, thereby forming as a semiconductor chip, as shown in FIG. 4.

Since the external frame 2 and the wiring board 32 are blocked off from the outside by the sensor-side seal frame 20 and the wiring-board-side seal frame 22, the sealing resin 34 does not flow inside the external frame 2.

Operation and Effect

The present exemplary embodiment has the above described configuration and so exhibits the following excellent effect.

Namely, as shown in FIG. 2B, when acceleration is applied to the acceleration sensor 1, stress acts on the weight portion 8 from force due to inertia, and the weight portion 8 displaces in one or other direction of X, Y, Z shown in FIG. 1, or in a combination thereof. When the weight portion 8 displaces, the beams 6 connected to the weight portion 8 bend, thereby changing the resistance value of the piezoresistors 48 attached to the beams 6. The change in resistance value of the piezoresistor 48 is detected, and the acceleration that has been applied to the weight portion 8 (to the acceleration sensor 1 as a whole) is derived based on this detection result.

In the present exemplary embodiment, as shown in FIG. 4, the acceleration sensor 1 itself is a structure sealed by the sealing resin 34, in a configuration in which external stress applied to the sealing resin 34 is borne by the external frame 2.

Namely, external stress applied to the sealing resin 34 is borne by the external frame 2, and external stress is not transmitted directly to the silicon columns 4 that are separated by a gap from the external frame 2, or to the beams 6 that hold the weight portion 8 and extend out from the silicon columns 4

Accordingly, there is no concern of external stress affecting acceleration data measured by measuring the displacement of the beams 6, and since a process to cover the outside with a gel agent or the like is also not required, the number of processes, cost, and production time can also be reduced.

Second Exemplary Embodiment

FIGS. 5A and 5B, and FIGS. 6A and 6B show a structure of an acceleration sensor according to a second exemplary embodiment of the present invention. An acceleration sensor 101 according to the second exemplary embodiment of the present invention is in the form of a package, called a WCSP, indicating a package in which redistribution wiring, protection film, and terminals are formed while in the wafer state, for subsequent conversion into individual chips.

In the WCSP, the mounting surface area of the package is the same size as that of the semiconductor chip itself, there is no requirement for installation to a lead-frame, and there is the merit of being more compact than the first exemplary embodiment in which molding, with resin or the like, and forming the terminals is performed after the wafer has been converted into individual chips. Furthermore, due to connecting the bonding pads directly, rather than indirectly, to the substrate with Cu posts (solder balls) provided to the wiring board, the mounting surface area can be made even smaller.

In comparison to the first exemplary embodiment, since processes are completed by cutting out the sensors formed on the wafer by dicing and separating into individual sensors, a feature of the second exemplary embodiment is that the whole of the packaging process is completed in the wafer state.

As shown in FIGS. 5A and 5B, and FIGS. 6A and 6B, the acceleration sensor 101 according to the second exemplary embodiment of the present invention, similarly to the first exemplary embodiment, has a structure in which a gap is provided separating the external frame 2 and the silicon column 4. However, in contrast to the first exemplary embodiment, a signal is not transmitted externally to the sensor through the bonding pads 24, but a structure is adopted of direct mounting to a substrate or the like by connection terminals of Cu posts provided on the outside face of the wiring board 32, rather than through the lead frame 52. Furthermore, the sealing resin 34 is not employed, and the surrounding box structure with the external frame 2 forms the external profile of the sensor itself. Silicon etching is not performed to the bonding pad portions on the wiring board 32 of the present exemplary embodiment.

The sensor-side seal frame 20 provided to the external frame 2 and the wiring-board-side seal frame 22 provided to the wiring board 32 are thereby each provided at the outermost periphery, when viewed in plan view as in FIG. 5.

Figure 6A:
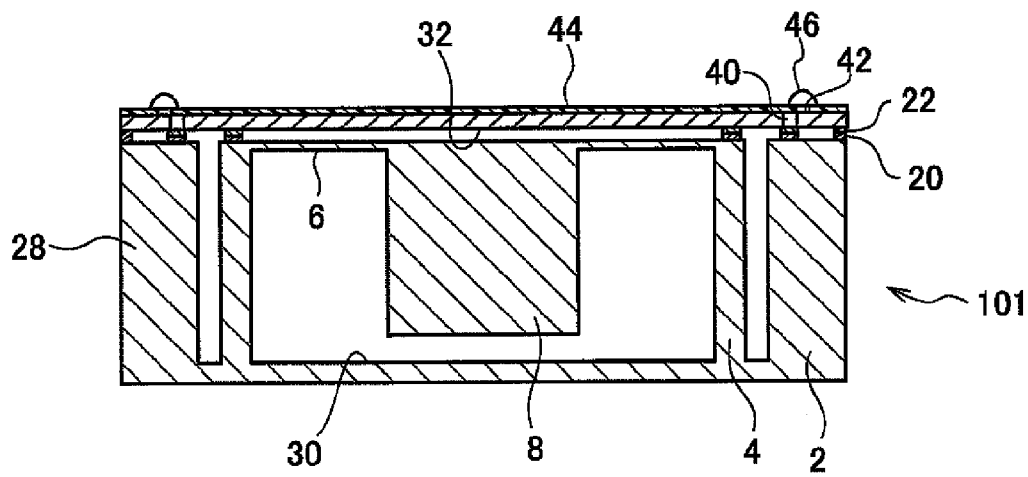
FIG. 6A and FIG. 6B are cross-section showing the structure of the acceleration sensor shown in FIG. 5A and FIG. 5B, and an enlargement thereof.
Figure 6B:
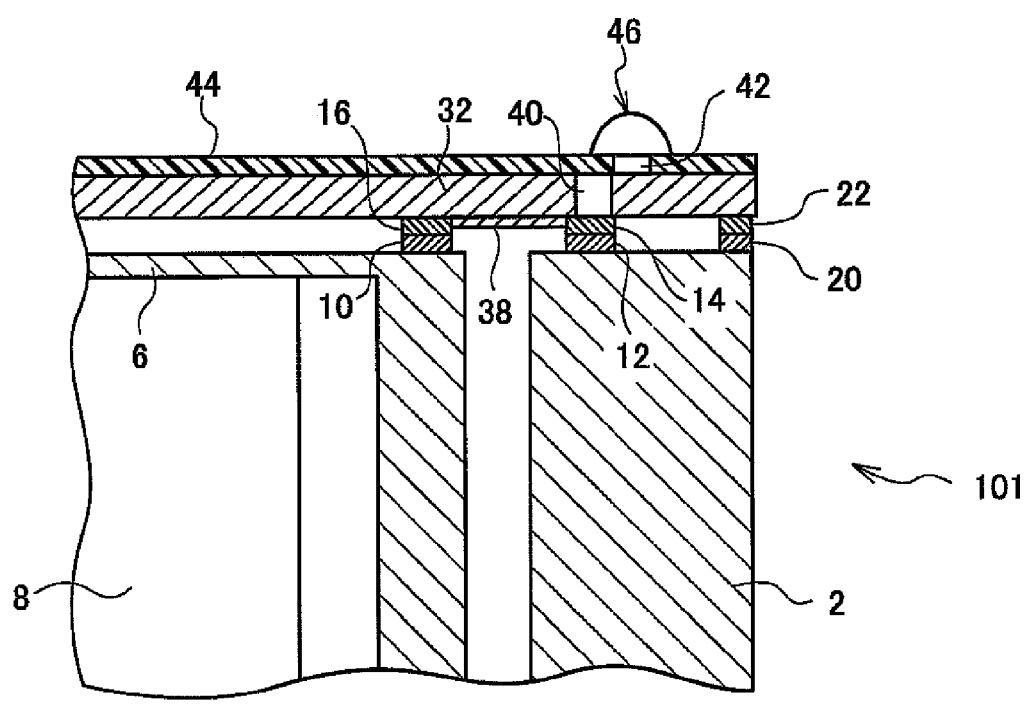

As a result, as shown in FIG. 6B, in order to join the external frame 2 and the wiring board 32, the sensor-side seal frame 20 and the wiring-board-side seal frame 22 provided at the outermost periphery thereof are bonded, and the inside of the external frame 2, namely the detection portion of the acceleration sensor 101, is sealed.

Furthermore, whereas the external-frame-top connection pads 12 provided on the external frame 2 are not electrically connected to the outside portion, they function as a spacer, maintaining a separation between the external frame 2 and the wiring board 32, and contact the outside wiring pads 14 on the wiring board 32 side at a height equivalent to the column-top connection pads 10 on the silicon columns 4.

In the present exemplary embodiment structured as a Wafer-Level Chip Size Package (WCSP), the acceleration sensor itself can be made more compact and a reduction in height is enabled, the degrees of freedom for mounting are raised, and a higher degree of integration is enabled in comparison to a package employing sealing resin. A reduction in cost and production time is possible due to reducing the number of components and the number of assembly processes.

Fabrication Method

Explanation now follows regarding a fabrication method of the acceleration sensor 101. However, it should be stressed that the materials, physical properties, dimensions and the like in the following explanation are merely an example thereof, and are not limitations on the method. Processes common to those of the first exemplary embodiment are omitted in the explanation.

Figure 11A:
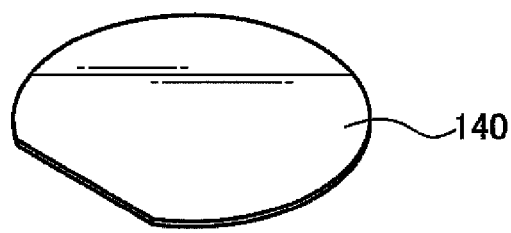
FIG. 11A to FIG. 11F are cross-sections showing a fabrication method of an acceleration sensor according to the second exemplary embodiment of the present invention.
Figure 11B:
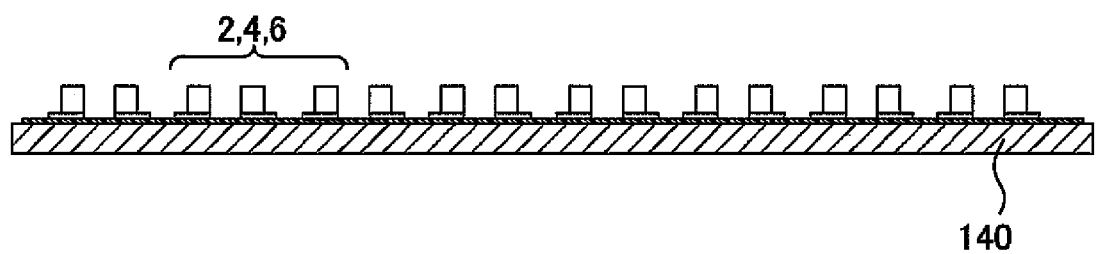

An external frame 2, silicon columns 4 and beams 6 and the like are formed, as shown in FIG. 11B, similarly to the first exemplary embodiment, an on a silicon wafer 140, as shown in FIG. 11A similar to that of the first exemplary embodiment.

Figure 11C:
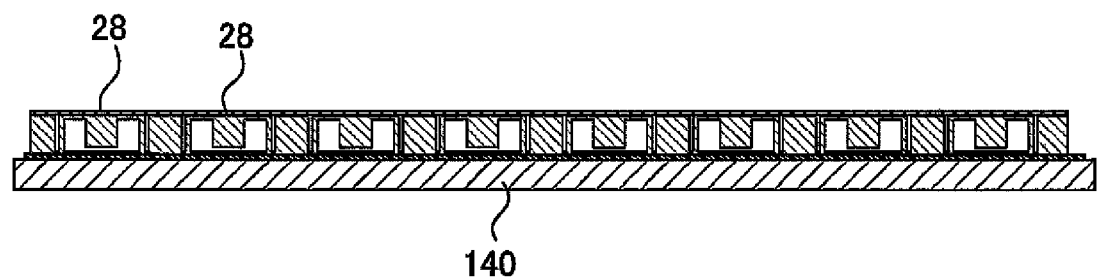

As shown in FIG. 11C, at the point where the processes to the sensor section 28 side are completed, similarly to the first exemplary embodiment, the sensor section 28 covered by the external frame 2 is formed on the silicon wafer, and the second exemplary embodiment is similar to the first exemplary embodiment up to the point when the opening of the external frame 2 is sealed by bonding the wiring board 32 to the external frame 2.

The fabrication method employed here for the wiring board 32 differs from that of the first exemplary embodiment in that an oxide film is first formed on the silicon substrate by silicon oxide by thermal oxidation processing. Cr and Au are formed as films on the top thereof by sputtering processing.

Next, as shown in FIG. 6B, the outside wiring pads 14 for making contact with the external-frame-top connection pads 12, and the inside wiring pads 16 for making contact with the column-top connection pads 10, and the wiring 38 for connecting the outside wiring pads 14 to the inside wiring pads 16 are formed by photolithography and etching.

Next, as shown in FIG. 11C, the above wiring board 32 is bonded by Au—Si eutectic bonding to the sensor section 28 that is itself bonded to a bottom face silicon substrate by Au—Si eutectic.

Figure 11D:
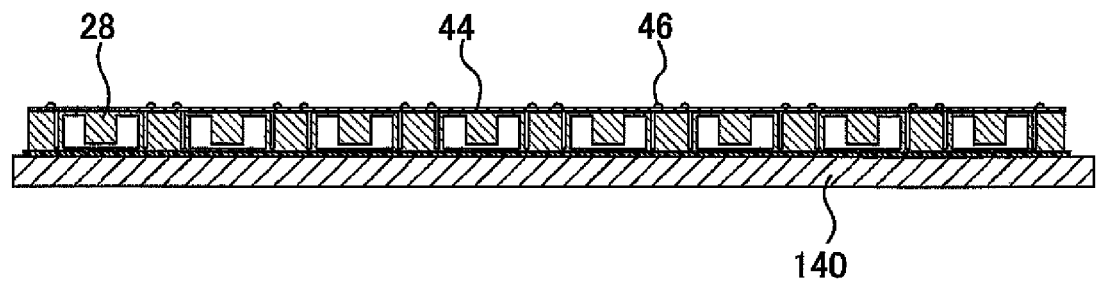

Next, as shown in FIG. 11D, silicon is etched using D-RIE at locations where though electrodes (Cu posts 40) are to be provided through resist that has been coated on the outside face of the wiring board 32, so as to also etch through the oxide film beneath. The side walls of the through holes are insulated by an oxide film, and the Cu posts 40 are formed so as to pass through the wiring board 32.

Epoxy resin or the like is layered on the outside face as protection layer 44, openings are formed in portions above the Cu posts 40 by photolithography, and after redistribution wiring the Cu posts 42 are formed. Solder balls 46 are additionally formed above the Cu posts 42, to serve in place of bonding pads.

Figure 11E:
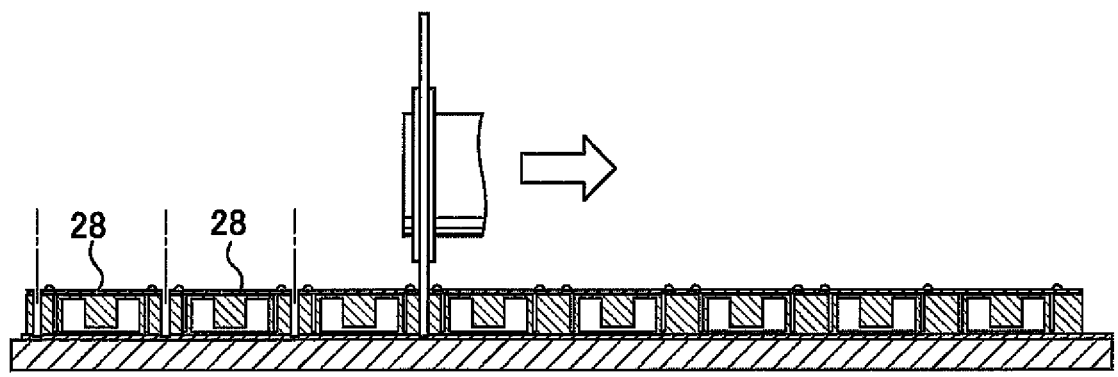

Next, as shown in FIG. 11E, individual of the sensor sections 28 are cut out by dicing and separated. Thereby, respective individual sensor sections 28 are formed as the acceleration sensor 101.

Figure 11F:
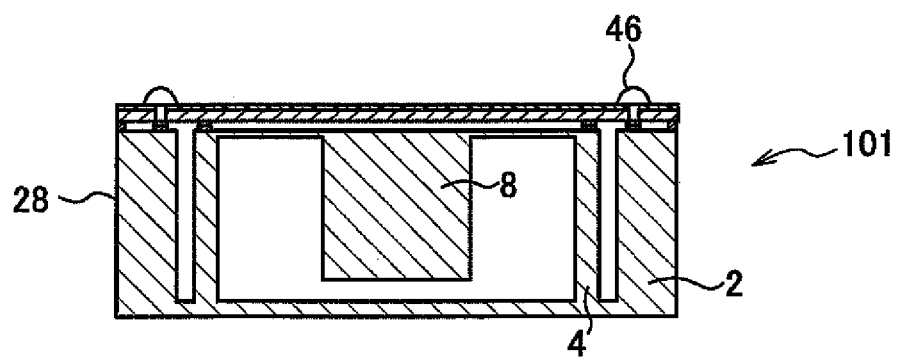

The completed acceleration sensor 101 is, as shown in FIG. 11F, an acceleration sensor unit having the solder balls 46 as external connection terminals, and, as shown in FIG. 6B, the sensor-side seal frame 20 running around the periphery of the external frame 2 is bonded together with the wiring-board-side seal frame 22, sealing the inside of the external frame 2, namely the detection portion of the acceleration sensor 101.

Since there is no requirement to perform sealing to the exterior of the above acceleration sensor 101 with a sealing resin, and since the external frame 2 and the silicon column 4 are separated from each other, there is no concern that external stress applied to the acceleration sensor 101 will be transmitted to the beams 6 and affect measurement precision.

Third Exemplary Embodiment

Figure 7A:
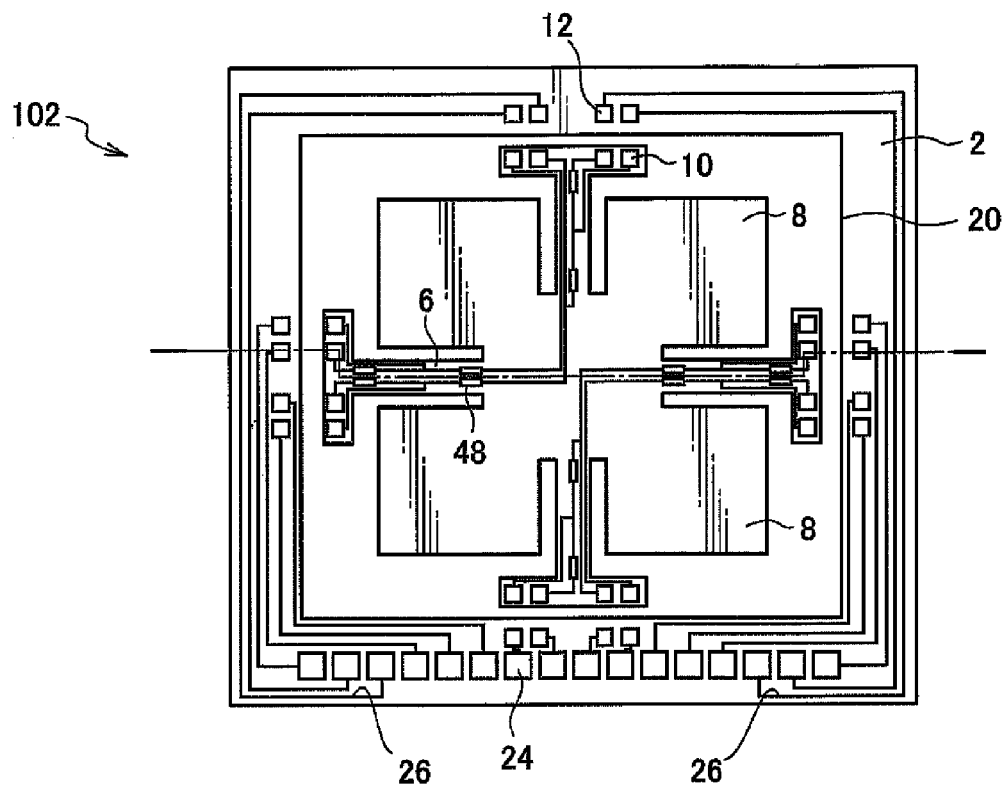
FIG. 7A and FIG. 7B are plan views showing a structure of an acceleration sensor according to a third exemplary embodiment of the present invention.
Figure 7B:
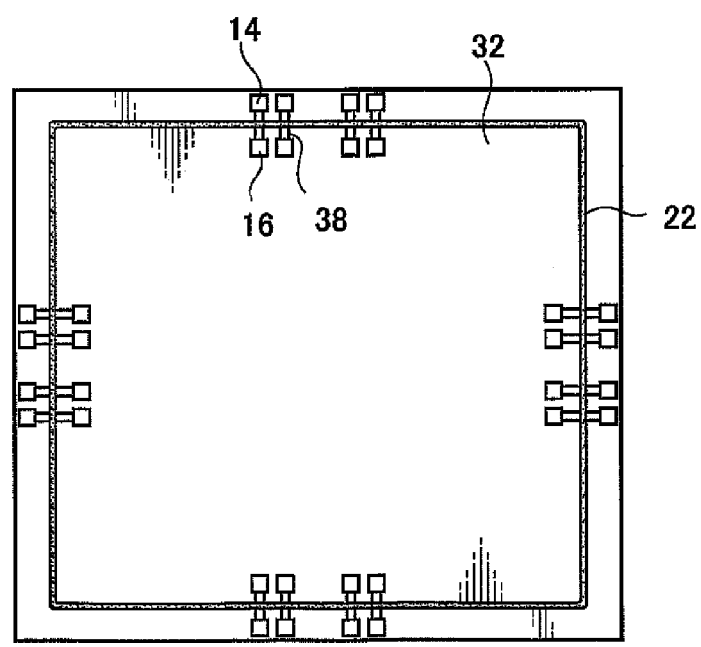

FIG. 7A and FIG. 7B show a structure of an acceleration sensor according to a third exemplary embodiment of the present invention. As shown in FIG. 7A and FIG. 7B, an acceleration sensor 102 according to the third exemplary embodiment of the present invention, similarly to in the first exemplary embodiment, is connected by the wiring 26 from the external-frame-top connection pads 12, which are electrically connected to the piezoresistor 48 provided to the beams 6, to the bonding pads 24 provided on the external frame 2.

Since the bonding pads 24 and the wiring 26 to the bonding pads 24 here on the external frame 2 can be placed as desired, configuration may be made such that, as shown in FIG. 7A, the bonding pads 24 are concentrated together.

In this configuration, by disposing the bonding pads 24 so as to be concentrated along an edge at one side of the acceleration sensor 102, wiring connection can be performed from a single edge, and since wiring is no longer required to be led around to four sides when mounting to a substrate or the like, degrees of freedom when mounting can be increased in comparison to the positional alignment in the first exemplary embodiment. By, as shown in FIG. 7B, making the shape and the component placement of the wiring board 32 similar to that in the first exemplary embodiment, common components can be employed.

CONCLUSION

Explanation has been given above regarding exemplary embodiments of the present invention, however the present invention is not limited by any of the above exemplary embodiments, and obviously various embodiments can be realized within a scope not departing from the spirit of the present invention.

For example, while the present invention relates to an acceleration sensor, application can also be made to a device structure in which an external frame is provided for the purpose of blocking external stress other than the above application. Namely, for example, the present invention can be applied to a three layer structure electrostatic capacitance angular velocity sensor application or the like, in which detection and drive electrode are disposed distributed between the uppermost layer and the lowermost layer. In such a case, external stress is prevented from being transmitted to beam member supporting a weight, as the central layer, and the external stress can be prevented from affecting measurement precision.

What is claimed is:

1. An acceleration sensor comprising:
a weight portion;
a plurality of fixed portions formed above a bottom plate around a periphery of the weight portion;
a beam portion coupling the fixed portions and the weight portion, and holding the weight portion at a position separated from the bottom plate;
a detection portion provided at the beam portion and detecting deformation of the beam portion;
a frame portion provided so as to project out from the bottom plate and surround the fixed portions at a position separated from the fixed portions;
a lid portion of plate shape that seals an opening of the frame portion;
a fixed portion connection pad provided at an end portion of the fixed portion and transmitting an electrical signal from the detection portion;
a first lid portion connection pad provided at the inside face of the lid portion and making contact with the fixed portion connection pad;
a second lid portion connection pad provided at the inside face of the lid portion and connected by wiring to the first lid portion connection pad;
a frame portion connection pad provided at the frame portion and making contact with the second lid portion connection pad; and
a bonding pad provided at the frame portion so as not to contact the lid portion and connected by wiring to the frame portion connection pad, for transmitting an electrical signal to outside of the acceleration sensor, wherein a plane of the beam portion facing the lid portion and a plane of the fixed portions facing the lid portion are in a same plane.

2. The acceleration sensor of claim 1, wherein the wiring provided at the lid portion is a diffusion layer wiring line.

3. The acceleration sensor of claim 1, wherein the bottom plate and the lid portion are glass substrates.

4. The acceleration sensor of claim 1, wherein an outside of the frame portion is sealed with a sealing resin, and a sealing frame is provided to each of the frame portion and the lid portion to prevent the sealing resin from penetrating inside the frame portion.

5. An acceleration sensor comprising, on a wafer for forming devices:
a weight portion;
a plurality of fixed portions formed above a bottom plate around a periphery of the weight portion;
a beam portion coupling the fixed portion and the weight portion, and holding the weight portion at a position separated from the bottom plate;

a detection portion provided at the beam portion and detecting deformation of the beam portion;

a frame portion provided so as to project out from the bottom plate and surround the fixed portions;

a plate shaped wiring board that seals an opening in the frame portion;

a fixed portion connection pad provided at an end portion of the fixed portion and transmitting an electrical signal from the detection portion;

a first wiring board connection pad provided at the inside face of the wiring board and making contact with the fixed portion connection pad;

a second wiring board connection pad provided at the inside face of the wiring board and connected by wiring to the first wiring board connection pad;

a frame portion connection pad provided at the frame portion and making contact with the second wiring board connection pad; and a post provided so as to pass through the wiring board, for transmitting an electrical signal from the second wiring board connection pad to outside of the wiring board, wherein the wafer is diced at the outside of the frame portion to form devices.

6. An acceleration sensor according to claim 5, wherein the wiring board is a control IC.

* * * * *